Sept. 4, 1928.   H. SCHLAICH   1,683,103
INDICATING INSTRUMENT
Filed March 4, 1924   2 Sheets-Sheet 1

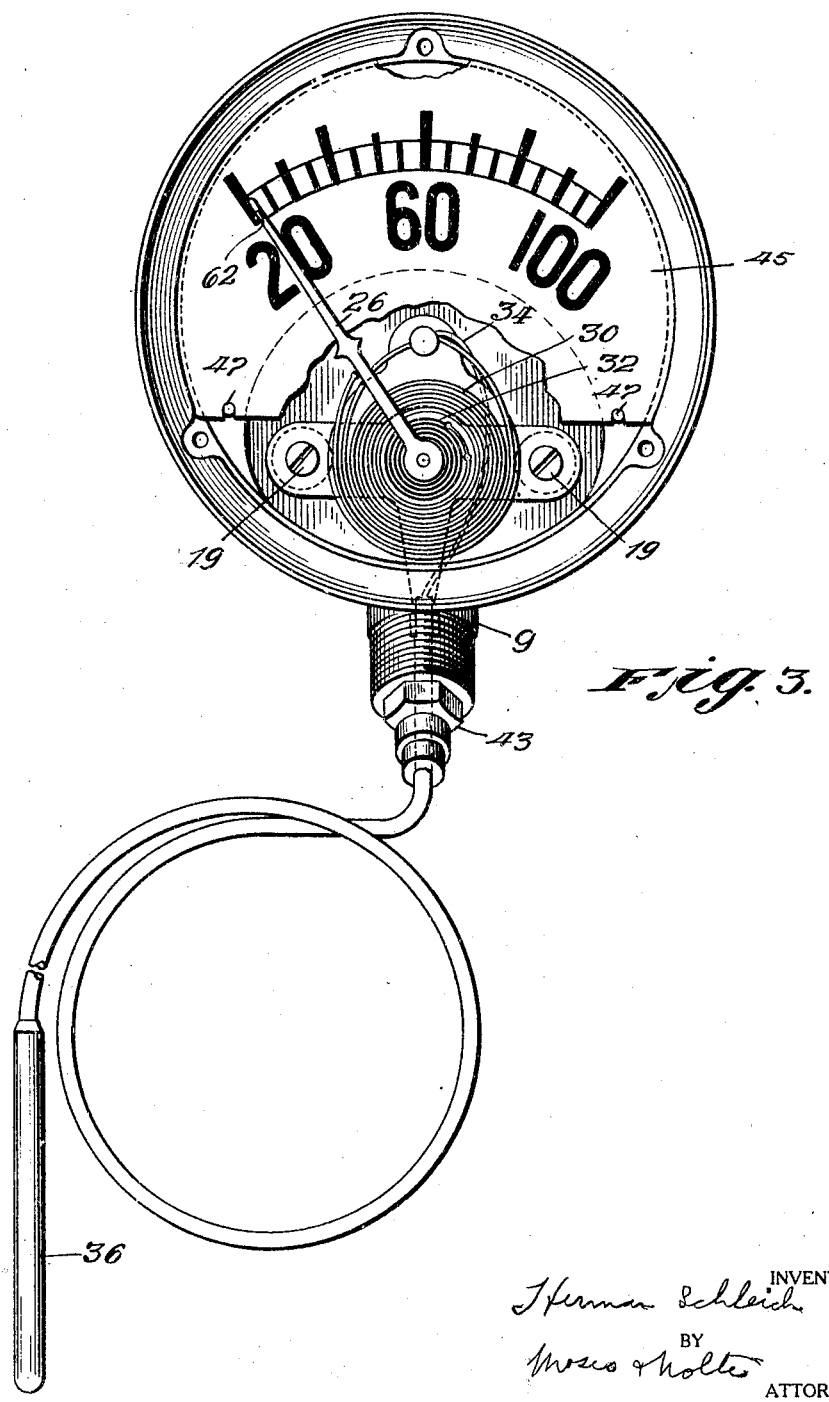

Patented Sept. 4, 1928.

1,683,103

UNITED STATES PATENT OFFICE.

HERMAN SCHLAICH, OF LONG ISLAND CITY, NEW YORK.

INDICATING INSTRUMENT.

Application filed March 4, 1924. Serial No. 696,813.

This invention relates to indicating instruments and is particularly, although not exclusively, useful in connection with thermometers of the type in which an indicating portion, adapted to show present and maximum temperatures, is located either near to or at some distance from the object or place whose temperature is being taken.

Figure 1:
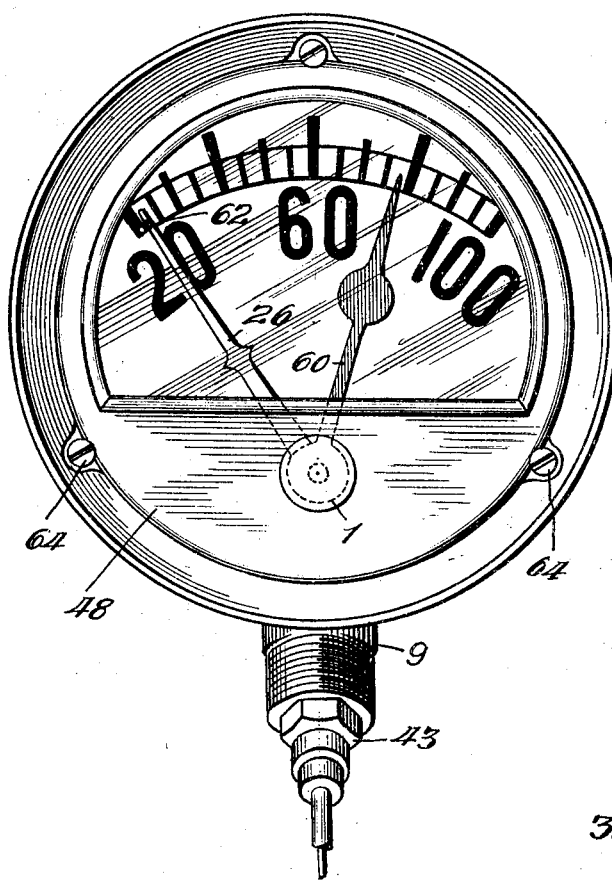
Figure 2:
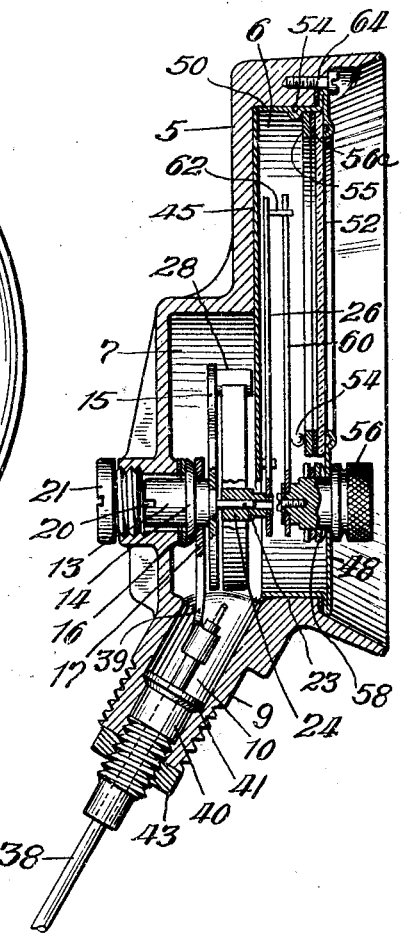

It is the general object of the invention to simplify the construction of the various parts of the indicating instrument, to the end that there may be provided a rugged instrument capable of being manufactured at low cost.
The invention will be understood from the following description taken in connection with the accompanying drawings in which a preferred embodiment thereof is described and illustrated.
Referring to the drawings, Figure 1 is a front elevation of the indicating portion of an instrument embodying the invention; Figure 2 is a sectional elevation thru the instrument shown in Figure 1; and Figure 3 is a front elevation of the instrument, with the crystal, its supporting frame and the maximum hand removed, and with a portion of the dial broken away to show the mechanism behind it.
Referring to the drawings, the various parts of the indicating portion of the instrument are shown as mounted in a casing 5 having a circular portion 6 and a recess 7 communicating with said circular portion from the lower edge thereof up to about the center thereof, as clearly shown in the drawings. Extending downwardly from the bottom of the casing 5, either vertically or at an angle as shown, is a neck 9 having an opening 10 therein communicating with the bottom of the recess 7.

Within the recess 7, is mounted the actuating portion of the instrument which may be of any suitable form, and the details of which form no part of the present invention. The particular mechanism shown, is practically the same as that shown and described in my co-pending application, Serial No. 618,158, filed February 9th, 1923. Briefly stated, this mechanism comprises an arbor 13 provided with a flange or collar 14 which is held in frictional engagement with washers 16 interposed between said collar and the back of the casing 5, by means of a plate 17 which engages the outside of the collar 14 and exerts a constant pressure thereon owing to the fact that the plate 17 is slightly flexed before it is attached to the back of casing 5 by means of screws 19. At its rear end, the spindle 13 is preferably slotted as shown at 20 to facilitate its rotation by means of a screw driver, this end being normally hidden by a screw plug 21 located in the outside end of the recess in the frame 5 into which the spindle 13 projects. At its forward end, the spindle 13 carries a plate 15 which is rigidly attached to said spindle; and projecting axially from said spindle is a pin 23 which serves as a pivot for the hub 24 of a pointer 26. Projecting forwardly from the plate 15, is a post 28 to which is attached the outer end of a Bourdon tube 30 which at its inner end is connected to the outer end of a compensating coil 32 the inner end of which is attached to the hub 24. With this construction, the hub 24 is held against longitudinal movement on the pin 23 by the Bourdon tube and compensating coil, thereby making end thrust bearings unnecessary. The outer end of the Bourdon tube 30 is connected in a well known manner to a capillary or fine bore tube 34 which passes out of the casing 5 thru the neck 9, and is connected to a bulb 36 which is filled or partially filled with some fluid, such as alcohol, which has a high coefficient of expansion under temperature changes.

The tube 34, outside of the casing 5, is preferably covered with a protecting tube 38 of suitable material which at its inner end is secured to the end of an arm 39 projecting downwardly from the plate 17. In order to provide a tight joint where the tube 38 enters the casing 5, there may be attached to the outside of the tube 38 a plug 40 of the form shown in Figure 2, which at its inner end is provided with a flanged head 41 adapted to engage a shoulder in the passage 10, and at its outer end is threaded so as to receive a nut 43 which engages the outer end of the neck 9 and draws the flanged head 41 of the block 40 into snug engagement with the shoulder in the cavity 10. Behind the pointer 26, and in cooperative relation thereto, is a dial 45 which is adapted to lie against the back of the circular portion 6 of the casing 5, and is secured in a certain angular position therein by means of pins 47 which project from the back of the casing 5 and cooperate with notches in the bottom of the dial 45. Designed for cooperation with the circular portion 6 of the casing 5, is a face-plate 48 in which is provided a window which extends over considerably more than half of the area of said face-plate. The form of this face-plate is best shown in Figures 1 and 2, from which it will be apparent that it is provided with an inwardly extending flange 50 which covers the cylindrical inner wall of the portion 6 of the casing, and at its inner edge engages the dial 45 and holds the latter firmly in place. The pane of glass 52 which extends over the window in the frame 48, is preferably held in place by bent-in portions 54 in the flange 50 of the face plate, a frame 55 of metal and a gasket 56ª of some yielding material being interposed between the bent-in portions 54 and the glass 52. Rotatably mounted in the lower portion of the face-plate 48, is a button 56 which is preferably provided with a knurled head to facilitate its manual rotation. This button 56 is rotatable in the face plate 48, and is frictionally held in any position to which it may be turned by means of a spring washer 58 which surrounds the shank of the button 56 inside the face plate 48 and is held in engagement with the inside of the face plate in any suitable manner. The button 56, the axis of which is in alignment with the pin 23 upon which the hub of the pointer 26 is rotatably mounted, is provided at its inner end with a band 60 which is of substantially the same length as the pointer 26, and cooperates with the scale on the dial 45. The pointer 26 is provided with a bent-up portion 62 which extends outwardly into the path of the hand 60 and engages the latter on one side, whereby movement of the pointer 26 in the direction of higher indications on the dial 45 will cause movement of the hand 60 to indicate maximum readings of the instrument. It will be understood that the frictional resistance to rotation of the button 56 in the face-plate 48 is made so slight that movement of the hand 60 takes place without materially affecting the accuracy of the reading represented by the pointer 26. As shown in Figures 1 and 2, the face-plate 48 is secured to the casing 5 by means of screws 64 which screw into the casing 5 and are provided with heads which engage the face-plate 48.

The ease with which the various parts of the instrument above described may be assembled, is obvious. The parts carried by the spindle 13 are first secured to the casing by the screws 19. The dial 45 is then slipped into place behind the pointer 26. The assembling operation is then completed by putting on the face-plate 48, carrying the window glass 52 and the hand 60, the screws 64 being used to hold the face-plate in place. Calibration of the instrument may be accomplished in any well-known manner, with the aid of a screw driver by which the spindle 13 may be rotated so as to adjust the position of the pointer 26 with reference to the scale on the dial plate 45.

The means for calibrating the indicating mechanism is not claimed herein but is claimed in my pending application Serial No. 514,196 for instruments, filed November 10, 1921.

What I claim is:

1. In an instrument, a casing, an indicating mechanism mounted therein having a pointer moving within said casing, a dial mounted in cooperative relation to said pointer, a face-plate removably secured to said casing and provided with a window thru which the dial and pointer are visible, a hand for recording maximum indications of said pointer pivotally mounted on said face-plate and arranged to be moved by said pointer and means projecting through the face plate to the front thereof for moving the maximum hand into engagement with the pointer.

2. In an instrument, a casing, an indicating mechanism mounted therein having a pointer pivotally mounted for movement within said casing, a dial mounted in cooperative relation to said pointer, a face-plate removably secured to said casing and provided with a window thru which the dial and pointer are visible, a hand for recording maximum indications of said pointer pivotally mounted on said face-plate below the window therein, means whereby said pointer and hand cooperate to cause movement of the hand by the pointer in the direction of the higher indications, and manually operable means for moving said hand into engagement with the pointer.

3. In an instrument, a casing having a circular portion and a recess communicating with said circular portion from the lower edge thereof up to about the center thereof, an indicating mechanism mounted in said recess and having a pointer moving within said circular portion of the casing above said recess, a dial mounted behind said pointer in the circular portion of said casing, a face-plate removably secured to said casing and provided with a window thru which the dial and pointer are visible, a hand for recording the maximum indications of said pointer pivotally mounted on said face plate below the window therein and adapted to be moved by said pointer, and manually operable means for moving said hand into engagement with the pointer.

4. In an instrument, a casing, a dial in said casing, a face-plate removably secured to said casing and provided with a window thru which the dial is visible and having an integral flange fitting the interior of the casing and arranged to engage the margin of said dial and retain the latter in place, and means for positively securing the face plate in fixed relation to the casing and dial.

5. In an instrument, a casing, a face-plate adapted to be secured to said casing and comprising a front portion having therein an opening extending over more than half the area of said face-plate, an indicating mechanism mounted in said casing and having a pointer visible thru said opening, a hand pivotally mounted on said face-plate below said opening therein on an axis in line with the axis of said pointer, and manually operable means on the front of said face plate for moving said hand into engagement with the pointer.

In testimony whereof I have affixed my signature to this specification.

HERMAN SCHLAICH.